United States Patent Office
3,794,668
Patented Feb. 26, 1974

3,794,668
VAPOR PHASE OXIDATION OF PHENOLS
Thomas H. Larkins, Jr., Kingsport, Tenn., assignor to Eastman Kodak Company, Rochester, N.Y.
No Drawing. Filed Sept. 25, 1972, Ser. No. 293,299
Int. Cl. C07c 37/00, 49/64
U.S. Cl. 260—396 R
8 Claims

ABSTRACT OF THE DISCLOSURE

Process for the vapor phase oxidation of phenols and substituted phenols in aqueous solution by contacting a vaporized aqueous solution of the phenol or substituted phenol with an oxygen-containing gas, preferably air, in the presence of a catalyst comprising a copper salt, thallic salt and an alkali metal bisulfate supported on silicon carbide or silica alumina having a surface area of less than 30 square meters per gram.

---

This invention relates to the production of compounds of the general formulas

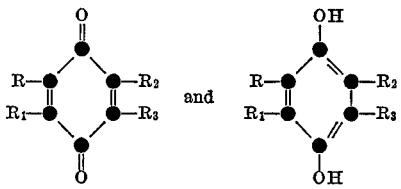

by the oxidation of phenols of the general formula

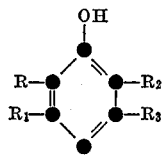

wherein R, $R_1$, $R_2$ and $R_3$ are each hydrogen or an alkyl group having from 1 to 10 carbon atoms, in the presence of a catalyst containing copper, thallium, and an alkali metal bisulfate on low surface area supports. This invention is of special interest in the production of hydroquinone and p-benzoquinone wherein R, $R_1$, $R_2$ and $R_3$ in the formulas above are hydrogen.

Hydroquinone and benzoquinone are known in the art to be reactive chemicals having many important industrial uses. Benzoquinone can easily be reduced to hydroquinone, and can function as an oxidizing agent in organic reactions. Hydroquinone can function as a reducing agent in chemical reactions, and as an antioxidant in gasoline, rubber, plastics, and the like. Hydroquinone is also useful in photographic chemistry and derivatives thereof are useful as food antioxidants.

It is known that phenol is sensitive to air oxidation, but a problem has existed in that the air oxidation of phenol led to formation of a number of oxidation products other than hydroquinone and benzoquinone. The present invention provides a process for the air oxidation of phenols to hydroquinones and benzoquinones. Furthermore, the present invention provides such a process which may be carried out in the vapor phase, a considerable advantage where large quantities of the starting material are to be oxidized.

It is accordingly an object of the present invention to provide a method for the vapor phase oxidation of phenols to hydroquinones and benzoquinones.

It is another object of the present invention to provide a catalyst for the oxidation of phenols in the vapor phase to hydroquinones and benzoquinones.

Other objects and advantages of the invention will be apparent from the following description, examples and appended claims.

According to this invention, the catalyst comprises a mixture of copper, thallium and an alkali metal bisulfate on a low surface area support. Preferably, the copper and thallium are in the form of cupric and thallic salts of acids such as nitric, sulfuric and acetic. In a preferred embodiment of the invention, the catalyst contains between about 0.1% and about 10.0%, preferably between about 0.5% and about 2.0% by weight, of a cupric salt such as cupric sulfate, cupric nitrate or cupric acetate; a thallic salt such as thallic sulfate, thallic nitrate or thallic acetate containing an amount of thallium equivalent to that contained in from about 0.1% to about 10.0%, preferably about 0.4% to about 1.5%, by weight, of thallic oxide; and between about 2.0% and about 20.0%, preferably between about 6.0% to about 12.0% by weight, of an alkali metal bisulfate. These percentages are based on the total weight of the catalyst including the support, and the remaining weight percent in any particular case would be made up of the support. Suitable alkali metal bisulfates include lithium bisulfate, rubidium bisulfate, sodium bisulfate, potassium bisulfate and cesium bisulfate. Of the alkali metal bisulfates, lithium bisulfate is preferred.

In general, the catalyst preferably is prepared by forming an aqueous solution of the copper and thallium salts and the alkali metal bisulfate. The aqueous solution is applied to an inert, low surface area support such as silica-alumina or silicon carbide. Carborundum AMO, a silica-alumina marketed by Carborundum Co., or Norton SA–5209, a silica-alumina marketed by Norton Co., ground and screened to about 8 x 20 mesh have been found to be suitable as the catalyst support. It has been found that it is essential that the surface area of the support be less than 30 square meters per gram, preferably less than 10 square meters per gram, and most desirably less than 1 square meter per gram. Excess liquid is removed from the catalyst prior to use.

In general, the process of the present invention is practiced by placing the catalyst described above in a tubular reactor, and heating to a reaction temperature of between about 350° C. and about 550° C., preferably between about 425° C. and about 475° C. A mixture of air and liquid aqueous phenol is preheated, at which time the aqueous phenol solution is vaporized, and then passed through the catalyst bed. The weight ratio of water to phenol should be at least about 9:1 by weight, and preferably above 20:1 for the most desirable yields. Most desirably, the weight ratio of water to phenol is 50:1 or greater. To provide adequate catalyst life and to provide practical yields, the mole ratio of oxygen to phenol should be at least 10:1. A contact time of 0.1 to 10 seconds, preferably 1 to 3 seconds, is adequate. The gaseous products leaving the reactor are passed into a condenser which condenses the products condensable at chilled water temperature. Any gaseous products not condensable by the chilled water (slightly above freezing) are vented away. The liquid product contains a mixture of benzoquinone and hydroquinone, along with unreacted phenol and small amounts of reaction by-products such as catechol, resorcinol, maleic acid, etc. The benzoquinone and hydroquinones can be recovered by distillation.

While air is the most economical source of oxygen, any suitable oxygen-containing gas such as pure oxygen, or mixtures thereof with inert gaseous diluents may be employed. It will, of course, be understood that the oxygen supplied by the continuous introduction of air or other oxygen-containing gas is the fundamental source of oxygen for the oxidation reaction, and sufficient oxygen must be supplied to complete the reaction.

The following examples are submitted for a better understanding of the invention.

EXAMPLE I

A catalyst is prepared by adding 0.8 gram of solid thallic oxide to 5 cc. of concentrated nitric acid and 10 cc. of water. This mixture is heated at a temperature of about 50° C. on a steam bath until a clear, colorless solution is formed. To this solution is added (1) a solution of 1.1 grams cupric sulfate pentahydrate in 15 cc. water, and (2) 8.1 grams lithium hydrogen sulfate in 100 cc. water. The lithium hydrogen sulfate is prepared from 2.9 grams lithium carbonate and 7.6 grams concentrated sulfuric acid. The composite, clear-blue solution is poured on 90 grams of a silica-alumina support having a surface area of less than 1 square meter/gram, which has been ground and screened to 8 x 20 mesh. The excess water is removed by heating on a steam bath and the catalyst is calcined 3 hours at 350° C. in air in a muffle furnace.

EXAMPLE II 25 cc. of the catalyst prepared in Example I is placed in a tubular reactor with 20 cc. of 8 x 20 mesh Vycor chips above and below the catalyst. Air at a rate of 47 cc. per minute, measured at standard temperature and pressure, is passed over the catalyst. The reaction temperature is 450° C. A mixture of phenol in water containing 1.75% phenol is fed into the reactor at a rate of 0.20 cc. per minute. The oxygen-phenol mole ratio is 10:1 and the contact time is 2.0 seconds. Essentially all of the phenol is consumed. The yield and conversion to p-benzoquinone and hydroquinone, combined and calculated as hydroquinone, is 25%, with a product ratio of approximately 60% hydroquinone and 40% p-benzoquinone.

EXAMPLE III

Example II is repeated using a reaction temperature of 435° C., a 6:1 oxygen-phenol weight ratio and 2.62 seconds contact time. The yield of hydroquinone is 14% and the conversion is 11%. The oxygen-phenol ratio is somewhat below optimum.

EXAMPLE IV

Example II is repeated, using a reaction temperature of 475° C., a 7.5:1 oxygen-phenol weight ratio and a contact time of 2.0 seconds. The yield of hydroqinone is 12% and the conversion is 11%. The oxygen-phenol ratio is somewhat below optimum.

EXAMPLE V

Example II is repeated, using 5% phenol in water, based on the combined weight of phenol and water, and a contact time of 2.0 seconds. The oxygen to phenol ratio is 10:1 and the temperature is 450° C. The yield of hydroquinone is 7% and the conversion is 4%. The concentration of phenol in water is higher than the optimum.

EXAMPLE VI

Example II is repeated, using 10% aqueous phenol at 450° C., an oxygen to phenol ratio of 10:1 and 2.0 seconds contact time. Only a trace of hydroquinone is found in the product. In this example, the concentration of phenol in water is quite high.

EXAMPLE VII

Example I is repeated, substituting the following compounds for the lithium hydrogen sulfate:

(a) sodium hydrogen sulfate
(b) potassium hydrogen sulfate
(c) rubidium hydrogen sulfate
(d) cesium hydrogen sulfate

EXAMPLE VIII

Example II is repeated, substituting the catalysts prepared in (a)-(d) of Example VII for the catalyst prepared in Example I. Yields of approximately 5% are obtained in each case.

EXAMPLE IX

A catalyst is prepared in accordance with Example I except the tallic oxide is omitted. This catalyst is used in the oxidation process of Example II. The catalyst is active initially for oxidation of phenol to hydroquinone, but soon becomes inactive.

EXAMPLE X

A catalyst is prepared in accordance with Example I except the cupric sulfate pentahydrate is omittted. The catalyst is used in the oxidation process of Example II. The catalyst is active initially for the oxidation of phenol to hydroquinone, but soon becomes inactive.

EXAMPLE XI

A catalyst is prepared in accordance with Example I, except the lithium hydrogen sulfate is omitted. The catalyst is used in the oxidation process of Example II. Only a trace of hydroquinone is found.

The following examples illustrate catalysts prepared in accordance with Example I and used in an oxidation process according to Example II, with the exception that the materials and amounts are varied as indicated. The yields are of hydroquinone.

EXAMPLE XII

| | Percent |
|---|---|
| $LiHSO_4$ | 8.1 |
| $Tl_2O_3$ | 10 |
| $CuSO_4$ | 1.1 |
| Norton SA-5209 | 80.8 |

Yield—approx. 5%.

EXAMPLE XIII

| | Percent |
|---|---|
| $LiHSO_4$ | 8.1 |
| $Tl_2O_3$ | 1.6 |
| $CuSO_4$ | 1.1 |
| Carborundum AMO | 89.2 |

Yield—approx. 18%.

EXAMPLE XIV

| | Percent |
|---|---|
| $LiHSO_4$ | 8.1 |
| $Tl_2O_3$ | 0.4 |
| $CuSO_4$ | 2.2 |
| Carborundum AMO | 89.3 |

Yield—approx. 16%.

EXAMPLE XV

| | Percent |
|---|---|
| $LiSHO_4$ | 2.0 |
| $Tl_2O_3$ | 0.2 |
| $CuSO_4$ | 0.3 |
| Carborundum AMO | 97.5 |

Yield—approx. 16%.

EXAMPLE XVI

| | Percent |
|---|---|
| $LiHSO_4$ | 4.0 |
| $Tl_2O_3$ | 0.8 |
| $CuSO_4$ | 1.1 |
| Carborundum AMO | 94.1 |

Yield—approx. 17%.

EXAMPLE XVII

| | Percent |
|---|---|
| $LiHSO_4$ | 8.1 |
| $Tl_2O_3$ | 0.8 |
| $CuSO_4$ | 2.2 |
| Carborundum AMO | 88.9 |

Yield—approx. 18%.

EXAMPLE XVIII

A catalyst is prepared by adding 0.8 gram of solid thallic oxide to 5 cc. of concentrated nitric acid and 10 cc. of water. This mixture is heated at a temperature of about 50° C. on a steam bath until a clear, colorless solution is formed. To this solution is added (1) a solution of 1.1 grams cupric sulfate pentahydrate in 15 cc. water and (2) 8.1 grams lithium sulfate in 100 cc. water. The composite, clear-blue solution is poured on 90 grams of a silica-alumina support having a surface area of less than 1 square meter/gram, which has been ground and screened to 8 x 20 mesh. The excess water is removed by heating on a steam bath and the catalyst is calcined 3 hours at 350° C. in air in a muffle furnace.

EXAMPLE XIX 25 cc. of the catalyst prepared in Example XVIII is placed in a tubular reactor with 20 cc. of 8 x 20 mesh Vycor chips above and below the catalyst. Air at a rate of 47 cc. per minute, measured at standard temperature and pressure is passed over the catalyst. The reaction temperature is 450° C. A mixture of phenol in water, containing 1.75% phenol, is fed into the reactor at a rate of 0.20 cc. per minute. The oxygen-phenol mole ratio is 10:1 and the contact time is 2.0 seconds. Essentially all of the phenol is consumed. The yield and conversion to p-benzoquinone and hydroquinone, combined and calculated as hydroquinone is about 7%.

Unless otherwise indicated, all parts, percentages and proportions are by weight.

Although the invention has been described in considerable detail with particular reference to certain preferred embodiments thereof, variations and modifications may be effected within the spirit and scope of the invention.

I claim:

1. The process of oxidizing a starting compound of the formula

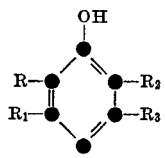

to a mixture of compounds having the formulas

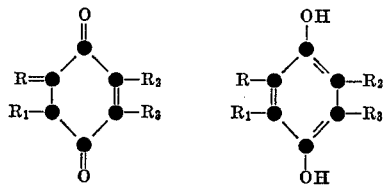

wherein R, R$_1$, R$_2$ and R$_3$ are each hydrogen or alkyl groups having from 1 to 10 carbon atoms which comprises:
   (a) vaporizing an aqueous solution of said starting compound in which the weight ratio of water to said starting compound is at least about 9:1;
   (b) contacting said vaporized solution with an oxygen-containing gas at a temperature of between about 350° C. and about 550° C. in the presence of a catalyst consisting essentially of
      (1) between about 0.1% and about 10.0% by weight of a salt selected from the group consisting of cupric sulfate, cupric nitrate, and cupric acetate,
      (2) a salt selected from the group consisting of thallic sulfate, thallic nitrate and thallic acetate containing an amount of thallium equivalent to that contained in from about 0.1% to about 10.0% by weight of thallic oxide,
      (3) between about 2% and about 20% by weight of an alkali metal bisulfate, and
      (4) between about 60% and about 97.8% of a support having a surface area of between about 0.001 and about 10 square meters per gram, on which said salts of (1), (2) and (3) are supported.

2. The process of claim 1 in which the starting compound is phenol.

3. The process of claim 1 in which the weight ratio of water to said starting compound is at least about 20:1.

4. The process of claim 1 in which the weight ratio of water to said starting compound is at least 50:1.

5. The process of claim 1 in which the mole ratio of oxygen feed to starting material feed is at least about 10:1.

6. The process of claim 1 in which the time of contact between said vaporized solution and said oxygen-containing gas is between about 0.1 and 10 seconds.

7. The process of claim 1 in which said oxygen-containing gas is air.

8. The process of oxidizing phenol to benzoquinone and hydroquinone which comprises
   (a) vaporizing an aqueous solution of phenol in which the weight ratio of water to phenol is at least about 20:1;
   (b) contacting said vaporized solution with air at a temperature of between about 425° C. and about 475° C. in which the mole ratio of oxygen to phenol is at least about 10:1, in the presence of a catalyst consisting essentially of
      (1) between about 0.5 and about 2.0% by weight of a salt selected from the group consisting of cupric sulfate, cupric nitrate and cupric acetate,
      (2) a salt selected from the group consisting of thalic sulfate, thallic nitrate and thallic acetate containing an amount of thallium equivalent to that contained in from about 0.4% to about 1.5% by weight of thallic oxide,
      (3) between about 6.0% and about 12.0% by weight of an alkali metal bisulfate, and
      (4) between about 84.5% and about 93.1% by weight of a compound selected from the group consisting of silicon carbide and silica alumina having a surface area of between about 0.001 and 1.0 square meters per gram, on which said salts of (1), (2) and (3) are supported.

References Cited
UNITED STATES PATENTS
3,671,552    6/1972    Le Bris et al. _____ 260—396 R VIVIAN GARNER, Primary Examiner U.S. Cl. X.R.
252—428, 438, 440; 260—621 G, 624 R

UNITED STATES PATENT OFFICE
CERTIFICATE OF CORRECTION

PO-1050
(5/69)

Patent No. 3,794,668     Dated February 26, 1974

Inventor(s) Thomas H. Larkins, Jr.

It is certified that error appears in the above-identified patent and that said Letters Patent are hereby corrected as shown below:

In Claim 1, column 5, lines 39 through 47, delete the formulas

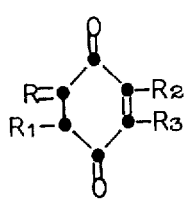 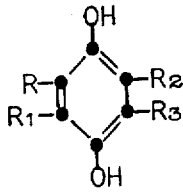

and insert therefor the following formulas

--- 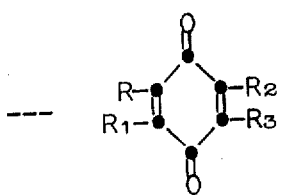 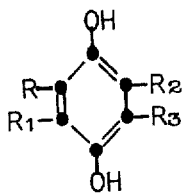 ---

In column 6, line 40, delete "thalic" and insert ---thallic---.

Signed and sealed this 29th day of October 1974.

(SEAL)
Attest:

McCOY M. GIBSON JR.
Attesting Officer

C. MARSHALL DANN
Commissioner of Patents